United States Patent
Yu et al.

(10) Patent No.: US 11,004,217 B2
(45) Date of Patent: May 11, 2021

(54) OBJECT TRACKING SYSTEM, OBJECT TRACKING METHOD, AND NON-TRANSITORY COMPUTER READABLE MEDIUM

(71) Applicant: Realtek Semiconductor Corporation, Hsinchu (TW)

(72) Inventors: Teng-Hsiang Yu, New Taipei (TW); Yen-Hsing Wu, Zhubei (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 195 days.

(21) Appl. No.: 16/424,815

(22) Filed: May 29, 2019

(65) Prior Publication Data
US 2020/0193621 A1 Jun. 18, 2020

(30) Foreign Application Priority Data
Dec. 14, 2018 (TW) ................................ 107145338

(51) Int. Cl.
*G06T 7/246* (2017.01)
*G06T 7/73* (2017.01)
*G06T 7/00* (2017.01)

(52) U.S. Cl.
CPC .............. *G06T 7/251* (2017.01); *G06T 7/75* (2017.01); *G06T 7/97* (2017.01); *G06T 2207/10016* (2013.01); *G06T 2207/20084* (2013.01)

(58) Field of Classification Search
CPC .. G06T 7/251; G06T 7/75; G06T 7/97; G06T 7/248; G06T 2207/20084; G06T 2207/10016
See application file for complete search history.

(56) References Cited

U.S. PATENT DOCUMENTS

| | | | |
|---|---|---|---|
| 2016/0112757 A1* | 4/2016 | Pan | G06K 9/00744 709/203 |
| 2016/0171311 A1* | 6/2016 | Case | G06K 9/00771 382/103 |
| 2016/0335809 A1* | 11/2016 | Forutanpour | G06T 7/579 |
| 2019/0114804 A1* | 4/2019 | Sundaresan | G06K 9/66 |
| 2019/0130583 A1* | 5/2019 | Chen | G06K 9/00711 |
| 2019/0213406 A1* | 7/2019 | Porikli | G06K 9/00389 |
| 2019/0304102 A1* | 10/2019 | Chen | G06K 9/6271 |
| 2019/0347806 A1* | 11/2019 | Vajapey | G06T 7/246 |
| 2019/0353775 A1* | 11/2019 | Kirsch | G01S 13/68 |

* cited by examiner

*Primary Examiner* — Carol Wang
(74) *Attorney, Agent, or Firm* — Locke Lord LLP; Tim Tingkang Xia, Esq.

(57) ABSTRACT

An object tracking method includes the following operations: detecting a first area of an object in a first video frame based on a deep learning model, in order to forecast a forecast area of the object in a forecast video frame according to the first video frame and the first area; detecting a second area of the object in a second video frame based on the deep learning model; and determining a correlation between the forecast area and the second area, in order to track the object.

16 Claims, 5 Drawing Sheets

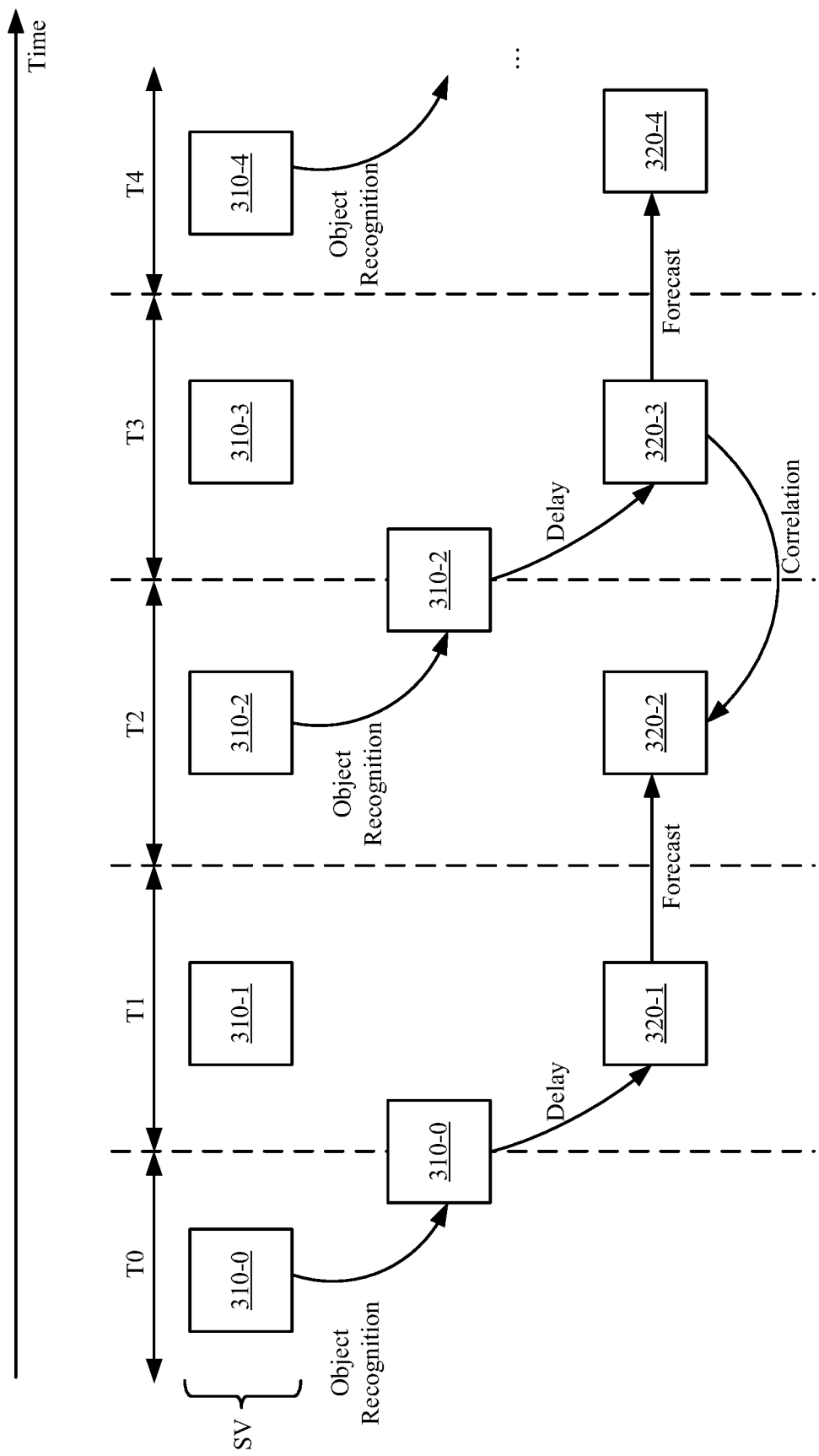

OBJECT TRACKING SYSTEM, OBJECT TRACKING METHOD, AND NON-TRANSITORY COMPUTER READABLE MEDIUM

RELATED APPLICATIONS

This application claims priority to Taiwan Application Serial Number 107145338, filed Dec. 14, 2018, which is herein incorporated by reference in its entirety.

BACKGROUND

Technical Field

The present disclosure relates to an object tracking system and method. More particularly, the present disclosure relates to the object tracking system, method, and a non-transitory computer readable medium which are performed with dropped frames.

Description of Related Art

Technologies applied with artificial intelligence (AI) (e.g., object detection and voice recognitions) have been developed in recent years. In object detection current approaches require raw video data to be directly inputted for detection. As a result, required data computations are too much, resulting in a higher waste in system performance.

SUMMARY

Some aspects of the present disclosure are to provide an object tracking system that includes a memory and a processor. The memory is configured to store at least one computer program code. The processor is configured to execute the at least one computer program code, in order to detect a first area of an object in a first video frame based on a deep learning model, in order to forecast a forecast area of the object in a forecast video frame according to the first video frame and the first area; detect a second area of the object in a second video frame based on the deep learning model; and determine a correlation between the forecast area and the second area, in order to track the object.

Some aspects of the present disclosure are to provide an object tracking method that includes the following operations: detecting a first area of an object in a first video frame based on a deep learning model, in order to forecast a forecast area of the object in a forecast video frame according to the first video frame and the first area; detecting a second area of the object in a second video frame based on the deep learning model; and determining a correlation between the forecast area and the second area, in order to track the object.

Some aspects of the present disclosure are to provide a non-transitory computer readable medium having a computer program which, when executed by a processor, result in the processor performing a plurality of operations as follows: detecting a first area of an object in a first video frame based on a deep learning model, in order to forecast a forecast area of the object in a forecast video frame according to the first video frame and the first area; detecting a second area of the object in a second video frame based on the deep learning model; and determining a correlation between the forecast area and the second area, in order to track the object.

As described above, the object tracking system and method and the non-transitory computer readable medium in embodiments of the present disclosure are able to continuous tracking the object by operations with dropped frame, in order to reduce the data computation.

BRIEF DESCRIPTION OF THE DRAWINGS

FIG. 3A is a schematic diagram illustrating relation between multiple raw video frames and delayed video frames according to some embodiments of the present disclosure.

DETAILED DESCRIPTION

The following embodiments are disclosed with accompanying diagrams for detailed description. For illustration clarity, many details of practice are explained in the following descriptions. However, it should be understood that these details of practice do not intend to limit the present disclosure. That is, these details of practice are not necessary in parts of embodiments of the present embodiments. Furthermore, for simplifying the drawings, some of the conventional structures and elements are shown with schematic illustrations.

Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

In this document, the term "coupled" may also be termed as "electrically coupled," and the term "connected" may be termed as "electrically connected." "Coupled" and "connected" may mean "directly coupled" and "directly connected" respectively, or "indirectly coupled" and "indirectly connected" respectively. "Coupled" and "connected" may also be used to indicate that two or more elements cooperate or interact with each other.

In this document, the term "circuitry" may indicate a system formed with one or more circuits. The term "circuit" may indicate an object, which is formed with one or more transistors and/or one or more active/passive elements based on a specific arrangement, for processing signals.

Figure 1:
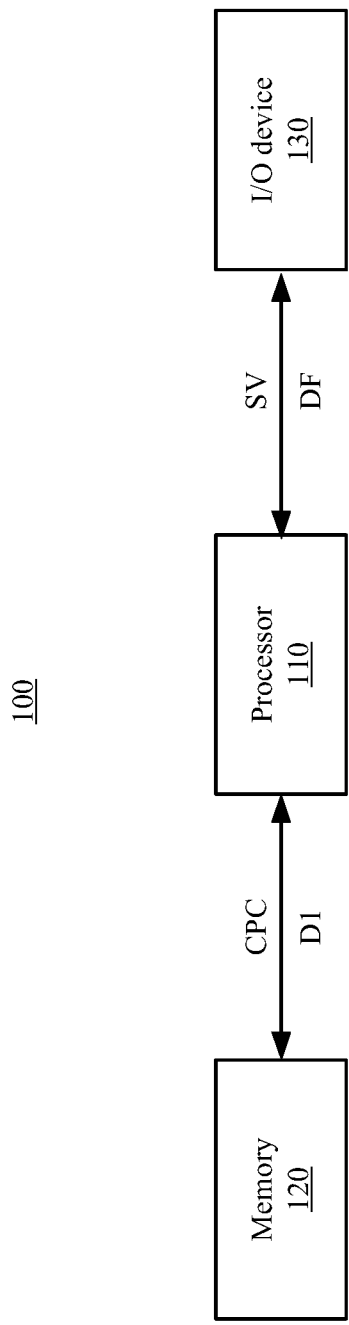
FIG. 1 is a schematic diagram of an object tracking system according to some embodiments of the present disclosure.

Reference is made to FIG. 1. FIG. 1 is a schematic diagram of an object tracking system 100 according to some embodiments of the present disclosure. In some embodiments, the object tracking system 100 may be utilized to track a location of a certain object. In some embodiments, the object tracking system 100 may be implemented on various electronic devices (e.g., computer, server, mobile phone, notebook, tablet, etc.).

In some embodiments, the object tracking system 100 includes a processor 110, a memory 120, and an input/output (I/O) device 130. The processor 110 is coupled to the memory 120 and the I/O device 130. In various embodiments, the processor 110 may be a central processing unit (CPU), an application-specific integrated circuit (ASIC), multi-processors, a distributed processing system, or any suitable processing circuit(s).

The memory 120 is configured to store at least one computer program CPC. In some embodiments, the memory 120 is further to store virtual data that corresponds to a deep learning model. In some embodiments, the deep learning model is implemented with a neural network (e.g., convolution neural network) by employing an artificial intelligence (AI) technology, and is trained with massive video (or image) data in advance, in order to perform object detection. In some embodiments, the processor 110 may execute the at least one computer program CPC, in order to analyze video (or image) data based on the deep learning model, in order to recognize at least one object (e.g., human face) in an image and its corresponding category. In some embodiments, the processor 110 may cooperate with at least one codec circuit (not shown) and/or a video processing circuit (not shown), in order to analyze the video data.

In some embodiments, the memory 120 may be a non-transitory computer readable storage medium. For example, the non-transitory computer readable storage medium may include a semiconductor or solid-state memory, a magnetic tape, a removable computer diskette, a random access memory (RAM), a read-only memory (ROM), a rigid magnetic disk, and/or an optical disk. In one or more embodiments using optical disks, the non-transitory computer readable storage medium includes a compact disk-read only memory (CD-ROM), a compact disk-read/write (CD-R/W), and/or a digital video disc (DVD).

The I/O device 130 is configured to receive video data SV including multiple raw video frames. In this disclosure, the raw video frame indicates video data that has not been performed with object detection. In some embodiments, the at least one computer program CPC may be encoded with instruction sets, in order to perform operations in FIG. 2 below. Accordingly, the processor 110 is able to analyze the video data SV, in order to generate data DF for tracking at least one certain object. In some embodiments, the I/O device 130 may be various types of data transmitter circuits or transceiver circuits, in order to receive the video data SV and to transmit the data DF to other system(s) or circuit(s).

Figure 2:
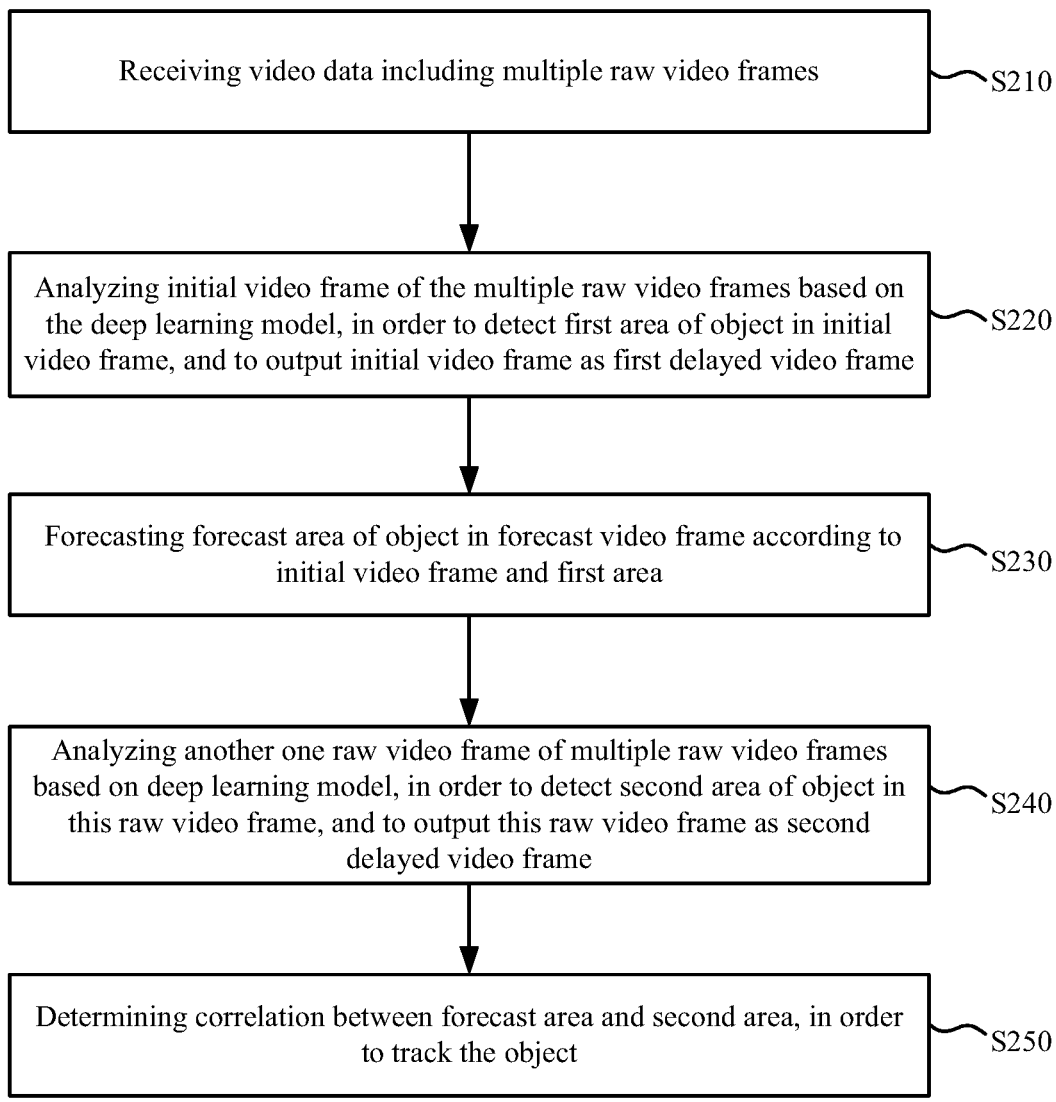
FIG. 2 is a flowchart of an object tracking method according to some embodiments of the present disclosure.

FIG. 2 is a flowchart of an object tracking method 200 according to some embodiments of the present disclosure. For ease of understanding, operations of the object tracking method 200 are described with reference to the object tracking system 100 in FIG. 1.

In operation S210, video data including multiple raw video frames is received.

In operation S220, an initial video frame of the multiple raw video frames is analyzed based on the deep learning model, in order to detect a first area of an object in the initial video frame, and to output the initial video frame as a first delayed video frame.

In operation S230, a forecast area of the object in a forecast video frame is forecasted according to the initial video frame and the first area.

Figure 3B:
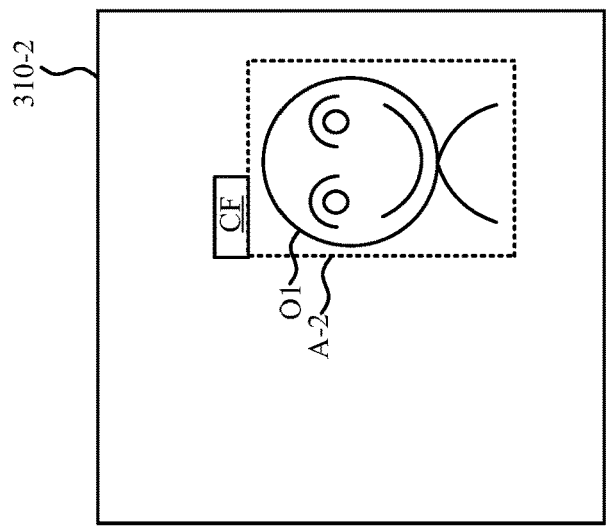
FIG. 3B is a schematic diagram illustrating operations of detecting the object according to some embodiments of the present disclosure.
Figure 3B:
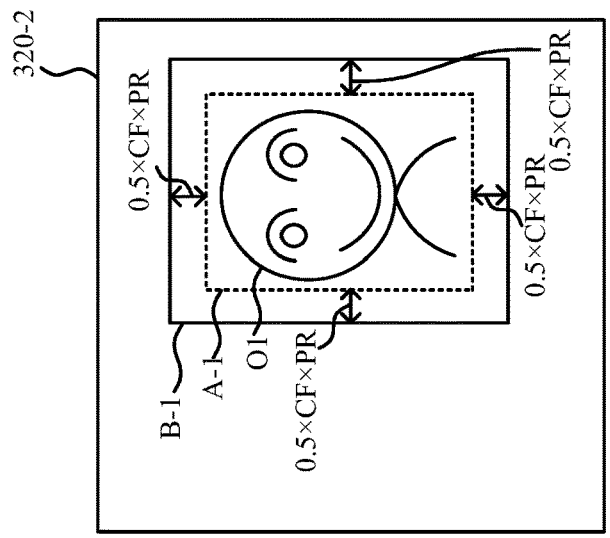
Figure 3B:
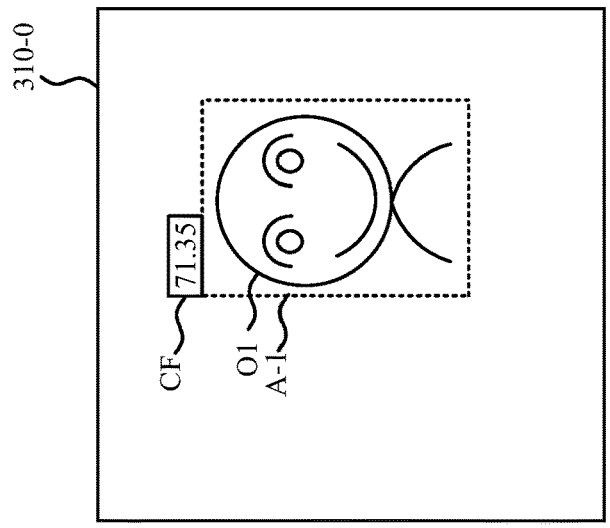

In order to understand operations S210 to S230, reference is made to FIG. 3A and FIG. 3B. FIG. 3A is a schematic diagram illustrating relation between multiple raw video frames and delayed video frames according to some embodiments of the present disclosure. FIG. 3B is a schematic diagram illustrating operations of detecting the object according to some embodiments of the present disclosure. For ease of understanding, like elements in FIGS. 3A and 3B are designated with the same reference numbers.

As shown in FIG. 3A, the I/O device 130 may receive the video data SV, which includes multiple raw video frames 310-0 to 310-4 corresponding times T0-T4 respectively. The raw video frame 310-0 is the initial video frame (i.e., an earliest video frame that corresponds to time T0). The processor 110 may analyze the raw video frame 310-0 based on the deep learning model, in order to recognize whether an object is present in the raw video frame 310-0 and to recognize that the object is located in an area A-1 of the raw video frame 310-0. The processor 110 delays the raw video frame 310-0 and outputs the delayed raw video frame 310-0 as an video frame 320-1, in which the video frame 320-1 and the raw video frame 310-1 substantially correspond to time T1.

As shown in FIG. 3B, in some embodiments, the object may be a human face O1. The processor 110 recognizes that the human face O1 is present in the raw video frame 310-0, and determines that the human face O1 is located in an area A-1 of the raw video frame 310-0. In some embodiments, the processor 110 outputs a confidence score CF when detecting the area A-1. In some embodiments, the confidence score CF indicates the credibility (or probability) of this detection determined by the deep learning model. For example, the confidence score CF corresponding to the area A-1 is 71.35. It is indicated that the object in the area A-1 has 71.35% chance of being a human face.

With continued reference to FIG. 3A, the processor 110 may generate a forecast video frame 320-2 based on information including the raw video frame 310-0 and the area A-1, in which the forecast video frame 320-2 and the raw video frame 310-2 substantially correspond to time T2. As shown in FIG. 3B, in some embodiments, the processor 110 directly outputs the raw video frame 310-0 as the forecast video frame 320-2, and determines that the object (e.g., human face O1) is located in a forecast area B-1 in the forecast video frame 320-2 according to the area A-1 and its corresponding confidence score CF. In some embodiments, the processor 110 may expand the area A-1 according a product of the confidence score CF and a predetermined ratio PR, in order to determine the forecast area 320-2.

For example, as shown in FIG. 3B, central locations of the area A-1 and the forecast area B-1 are the same. In some embodiments, the predetermined ratio PR may be 0.1. As described above, the confidence score CF is 71.35. Under this condition, the product of the confidence score CF and the predetermined ratio PR may be about 7. Thus, the processor 110 may extend a distance between upper and lower edges of the area A-1 by a distance of 7 pixels, and may extend a distance between left and right edges of the area A-1 by a distance of 7 pixels. Accordingly, each of upper, lower, left, and right edges of the area A-1 is extended outwardly by a distance of 3.5 (i.e., 0.5*CF*PR) pixels, in order to be the forecast area B-1.

In some embodiments, the forecast area B-1 is configured to be larger than the area A-1, in order to cover a moving range of the object in continuous times T1 and T2. The above generation of the forecast area B-1 and/or the value of the predetermined ratio PR are given for illustrative purposes, and the present disclosure is not limited thereto. Various generations of the forecast area B-1 and various values of the predetermined ratio PR are within the contemplated scope of the present disclosure.

With continued reference to FIG. 2, in operation S240, another one raw video frame of the multiple raw video frames is analyzed based on the deep learning model, in order to detect a second area of the object in this raw video frame, and to output this raw video frame as a second delayed video frame.

For example, as shown in FIG. 3A, the processor 110 may analyze the raw video frame 310-2 based on the deep learning model, in order to recognize the area A-2 of the object in the raw video frame 310-2. Afterwards, the raw video frame 310-2 is delayed and outputted as video frame 320-3, in which the video frame 320-3 and the raw video frame 310-3 substantially correspond to time T3.

As shown in FIG. 3B, similar to the above operations, the processor 110 recognizes that the human face O1 is also present in the raw video frame 310-2 based on the deep learning model, and determines that the human face O1 is located in the area A-2 in the raw video frame 310-2.

Figure 4:
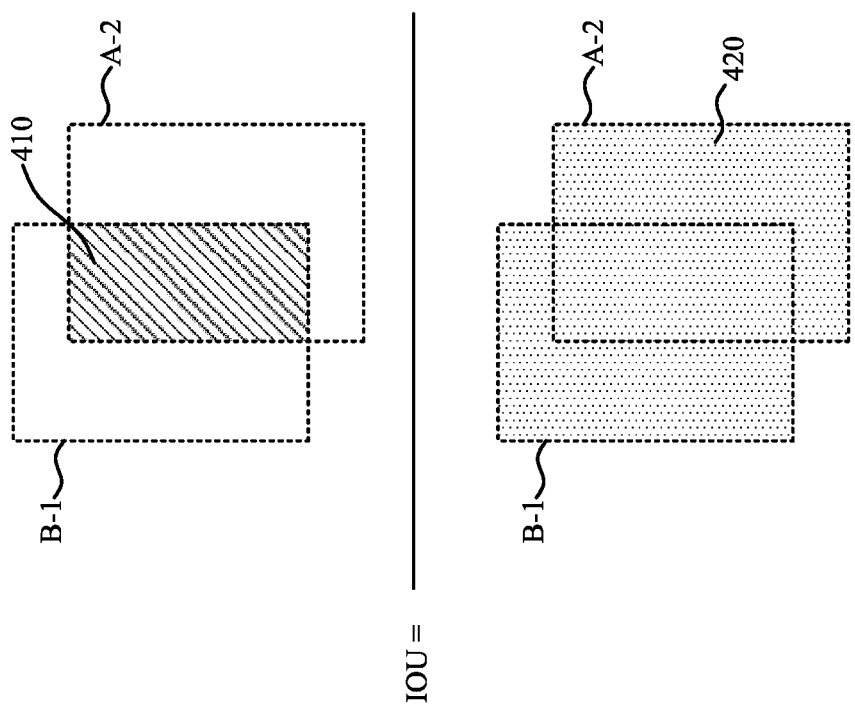
FIG. 4 is a schematic diagram illustrating an operation in FIG. 2 being performed according to the forecast area and the area in FIG. 3B, according to some embodiments of the present disclosure.

With continued reference to FIG. 2, in operation S250, a correlation between the forecast area and the second area is determined, in order to track the object. Reference is made to FIG. 4, and FIG. 4 is a schematic diagram illustrating operation S250 being performed according to the forecast area B-1 and the area A-2 in FIG. 3B, according to some embodiments of the present disclosure. For ease of understanding, like elements in FIG. 3B and FIG. 4 are designated with the same reference numbers.

In some embodiments, the processor 110 may perform an object detection function according to the forecast area B-1 and the area A-2, in order to evaluate the correlation of the object in two video frames. In some embodiments, the object detection function may be Intersection over Union (IOU). For example, as shown in FIG. 4, the processor 110 is able to determine the IOU based on an intersection 410 of the forecast area B-1 and the area A-2 and a union 420 of the forecast area B-1 and the area A-2, in which the IOU may be expressed as: IOU=410/420. If the IOU is closer to 1, the correlation between the forecast area B-1 and the area A-2 is higher. Under this condition, the forecast area B-1 is sufficient to indicate the location of the object (e.g., human face O1) at time T3; otherwise, if the IOU is farther away from 1, the forecast area B-1 is insufficient to indicate the location of the object (e.g., human face O1) at time T3, and thus a re-calibration or re-training may be performed.

As shown in FIG. 3A, the processor 110 is able to repeatedly perform the above operations according to subsequent raw video frames, in order to continue tracking the object. In some embodiments, the processor 110 is able to output information including multiple frames (e.g., video frames 320-1, 320-2, and 32903), timings corresponding to the frames, areas (e.g., areas A-1, A-2, and B-1), the confidence score CF and the correlation (e.g., IOU) as data DF to subsequent system or circuits, or to perform other operations according to the data DF, in order to show a result of tracking object.

As shown in FIG. 3A, in some embodiments, two raw video frames 310-1 and 310 that are analyzed based on the deep learning model are discontinuous frames. Equivalently, the object tracking method 200 may be considered as operations performed with dropped frames. In other words, in some embodiments, the processor 110 does not analyze every raw video frames in the received video data SV. As a result, data computations can be reduced. Moreover, with operation S230, the processor 110 is able to predict a possible location where an object may be located in the non-analyzed raw video frame (e.g., raw video frame 310-1), in order to continue tracking the object.

The above description of the object tracking method 200 includes exemplary operations, but the operations of the object tracking method 200 are not necessarily performed in the order described above. The order of the operations of the object tracking method 200 can be changed, or the operations can be executed simultaneously or partially simultaneously as appropriate, in accordance with the spirit and scope of various embodiments of the present disclosure.

In some embodiments, the object tracking method 200 may be implemented in hardware, software, firmware, and the combination thereof. In some embodiments, the object tracking method 220 may be implement with a computer program code or software that is encoded with coprresoinding instructions, and is stored in a non-transitory computer readable medium (e.g., the memory 120), in order to be accessed by a processor (e.g., processor 110) for performing the above operations.

For ease of understanding, the above descriptions are given with examples of tracking a single object, but the present disclosure is not limited thereto. Moreover, the type of the object is not limited to the human face. Various types of the objects are within the contemplated scope of the present disclosure.

As described above, the object tracking system and method and the non-transitory computer readable medium in embodiments of the present disclosure are able to continuous tracking the object by operations with dropped frame, in order to reduce the data computation.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuity in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An object tracking system, comprising:
  a memory configured to store at least one computer program code; and
  a processor configured to execute the at least one computer program code, in order to:
    detect a first area of an object in a first video frame based on a deep learning model, in order to forecast a forecast area of the object in a forecast video frame according to the first video frame and the first area;
    detect a second area of the object in a second video frame based on the deep learning model; and determine a correlation between the forecast area and the second area, in order to track the object, wherein the processor is configured to output a confidence score when detecting the first area, and to determine the forecast area according to the confidence score and the first area, and wherein the processor is configured to expand the first area according to a product of the confidence score and a predetermined ratio, in order to determine the forecast area.

2. The object tracking system of claim 1, wherein the first video frame and the second video frame are discontinuous video frames.

3. The object tracking system of claim 1, wherein the first video frame corresponds to a first time, the second video frame corresponds to a second time, and the forecast video frame corresponds to a third time between the first time and the second time.

4. The object tracking system of claim 1, wherein the processor is further configured to delay the first video frame and the second video frame, in order to track the object.

5. The object tracking system of claim 1, wherein the forecast area is larger than the first area.

6. The object tracking system of claim 1, wherein the processor is configured to determine the correlation according to an intersection of the forecast area and the second area and a union of the forecast area and the second area.

7. An object tracking method, comprising:

detecting a first area of an object in a first video frame based on a deep learning model, in order to forecast a forecast area of the object in a forecast video frame according to the first video frame and the first area;

detecting a second area of the object in a second video frame based on the deep learning model; and determining a correlation between the forecast area and the second area, in order to track the object, wherein detecting the first area comprises outputting a confidence score when the first area is detected and determining the forecast area according to the confidence score and the first area, and wherein determining the forecast area comprises expanding the first area according to a product of the confidence score and a predetermined ratio.

8. The object tracking method of claim 7, wherein the first video frame and the second video frame are discontinuous video frames.

9. The object tracking method of claim 7, wherein the first video frame corresponds to a first time, the second video frame corresponds to a second time, and the forecast video frame corresponds to a third time between the first time and the second time.

10. The object tracking method of claim 7, further comprising:

delaying the first video frame and the second video frame, in order to track the object.

11. The object tracking method of claim 7, wherein the forecast area is larger than the first area.

12. The object tracking method of claim 7, wherein determining the correlation comprises:

determining the correlation according to an intersection of the forecast area and the second area and a union of the forecast area and the second area.

13. A non-transitory computer readable medium having a computer program which, when executed by a processor, result in the processor performing a plurality of operations comprising:

detecting a first area of an object in a first video frame based on a deep learning model, in order to forecast a forecast area of the object in a forecast video frame according to the first video frame and the first area;

detecting a second area of the object in a second video frame based on the deep learning model; and determining a correlation between the forecast area and the second area, in order to track the object, wherein detecting the first area comprises outputting a confidence score when the first area is detected and determining the forecast area according to the confidence score and the first area, and wherein determining the forecast area comprises expanding the first area according to a product of the confidence score and a predetermined ratio.

14. The non-transitory computer readable medium of claim 13, wherein the first video frame and the second video frame are discontinuous video frames.

15. The non-transitory computer readable medium of claim 13, wherein the first video frame corresponds to a first time, the second video frame corresponds to a second time, and the forecast video frame corresponds to a third time between the first time and the second time.

16. The non-transitory computer readable medium of claim 13, wherein the forecast area is larger than the first area.

* * * * *